Feb. 12, 1957

G. FISCHER 2,781,104

SLEEVE FILTER PLANT

Filed Jan. 5, 1954

GEORG FISCHER
Inventor.

Mason Porter Miller & Stewart
Attorneys

Feb. 12, 1957 G. FISCHER 2,781,104
SLEEVE FILTER PLANT
Filed Jan. 5, 1954 2 Sheets-Sheet 2

GEORG FISCHER
Inventor.

Mason Porter Miller + Stewart
Attorneys

United States Patent Office 2,781,104
Patented Feb. 12, 1957

2,781,104

SLEEVE FILTER PLANT

Georg Fischer, Porz (Rhine), Germany

Application January 5, 1954, Serial No. 402,290

Claims priority, application Germany January 14, 1953

7 Claims. (Cl. 183—58)

The invention relates to a sleeve filter plant for dust-laden air or other gases containing dust and has for its object to produce a filter plant in which the cleaning of the filter sleeves can be carried out not only more easily and with greater care than in the known plants but also very thoroughly. Another object of the invention is to produce a sleeve filter plant in which the filter sleeves can be exchanged in a very simple manner.

In the known sleeve filter plants the cleaning of the filter sleeves is, in most cases, effected by suddenly releasing and stretching the sleeves which results in considerable wear because, on being relieved of tension the sleeves are liable to buckle near the bottom end. It has already been proposed to keep the sleeves stretched during the cleaning operation and, taking advantage of their elasticity, to subject them to more or less strong tensioning in the direction of the sleeve axis. This, however, also results in very heavy stressing of the sleeves and, moreover, does not ensure perfect cleaning.

It is also known to maintain the filter sleeves of a filter plant in stretched state during the cleaning and to impart thereto a linear jigging or shaking motion at right angles to the axis of the sleeve. However, a thorough cleaning cannot even be obtained in this manner, quite apart from the fact that the sleeves are subjected to one-sided mechanical stressing, the controlling elements, generally consisting of toe cams or the like, which are used for producing the linear shaking motion, being subjected to very heavy wear and consequently making the plants very noisy.

As compared therewith, the filter sleeves in the sleeve filter plant according to the invention are also kept taut or stretched during the cleaning operation and in addition are subjected to a rotary oscillating motion in a plane intersecting the axis of the sleeve, it being also recommended to add to this rotary oscillating motion a vibrating motion, for example by allowing the parts transmitting the rotary oscillating motion to strike against stationary parts of the sleeve filter plant while performing the rotary oscillating motion.

To produce the rotary oscillating motion of the sleeves, the invention preferably provides a rotary unbalanced device arranged concentrically in the filter chamber and preferably above the set of filter sleeves, which device transmits its movement to the filter sleeves, it being at the same time considered advisable to allow the unbalanced device to act on a frame which carries the tightly stretched sleeves suspended by their upper ends.

In order to transmit the rotary oscillating movements not only to the upper ends of the sleeves, whence these movements can communicate themselves over the entire length of the sleeves, the invention also provides for the movements of the unbalanced device to be positively transmitted to the middle portion of the tightly stretched sleeves, for example, by the fact that the filter sleeves are guided at a point intermediate their ends by apertures in a frame arranged in the casing of the filter chamber and freely movable in a sectional plane of the sleeve axis and this frame and also the frame carrying the upper ends of the filter sleeves are carried by rods suspended like pendulums within the casing of the filter chamber.

Stationary abutments are preferably co-ordinated to the pendulum rods to limit the amplitude of their oscillation and to produce an additional shaking effect, and, in order to be able to regulate these shaking movements, arrangements may be provided for braking the oscillating movements of the pendulum rods.

If the filter sleeves are connected at their lower ends to a stationary frame, the sleeve walls will be stressed more heavily near this point of connection than at any other point and so as to obviate the necessity of exchanging the whole sleeve when it becomes defective at this point, it is proposed, according to the invention, to divide the sleeves into sections in their length, to connect the ends of the coordinate sleeve sections to connecting sockets carried by this intermediate frame near the lower third of the entire length of the sleeves.

According to another feature of the invention, the casing of the filter plant accommodating the filter sleeve aggregate is closed above the shaking device by a cover giving easy access to the upper ends of the filter sleeves, and the driving mechanism for the shaking device is located outside this cover, the shaking device preferably comprising a rotary shaking member which receives its drive from a shaft extending through the cover of the casing of the filter plant.

A sleeve filter plant according to the invention is illustrated by way of example in the accompanying drawings, in which.

Figure 1:
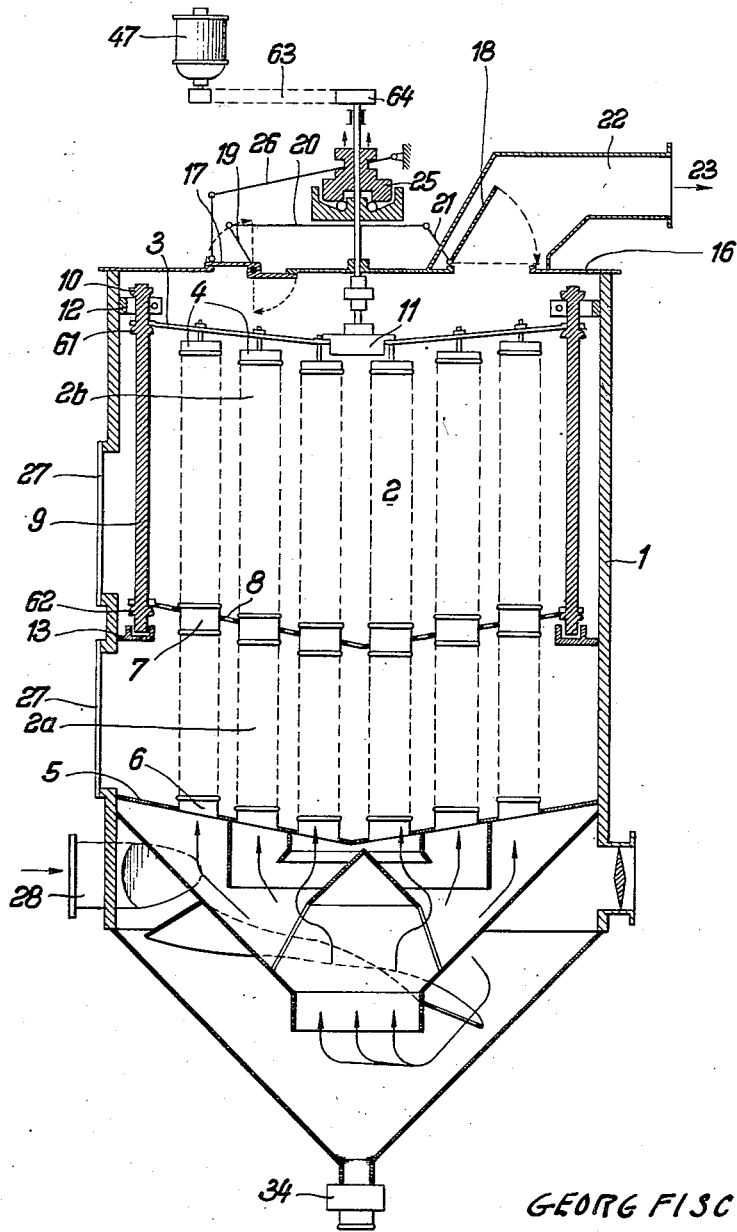
Fig. 1 is a longitudinal section of a chamber of a multiple chamber plant.
Figure 3:
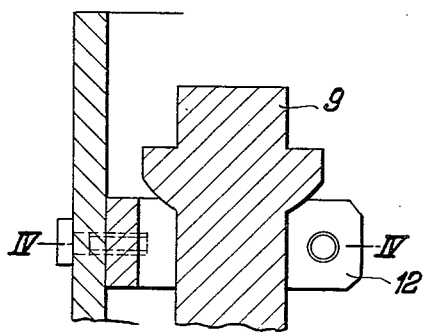
Figure 5:
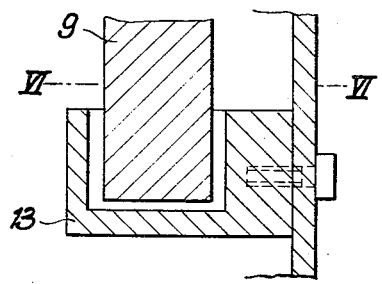
Figure 4:
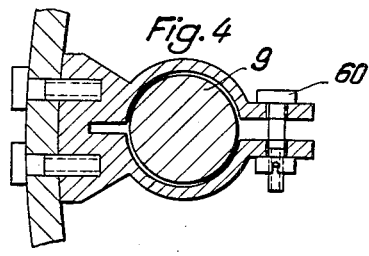
Figure 6:
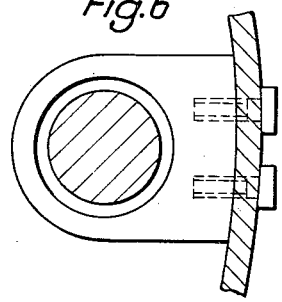

Fig. 3 shows in longitudinal section the upper end of one of the pendulum rods of the plant and of the holding device co-ordinated thereto, Figure 4 is a cross-section of the pendulum rod and its holder taken on line IV—IV of Fig. 3, Fig. 5 shows in longitudinal section the lower end of one of the pendulum rods of this plant and the abutments co-ordinated thereto, and Fig. 6 is a section on line VI—VI of Fig. 5.

The filter plant, which is only illustrated in sufficient detail to enable the invention to be understood, comprises several filter chambers each of which has a casing 1 which surrounds a filter sleeve assembly 2. The individual filter sleeves are divided into a short lower section 2a and a longer upper section 2b. The upper ends of the sleeve sections 2b are fixed on sleeve covers 4 which are suspended in a frame 3 maintained at a certain height but freely movable in lateral direction. This frame 3 has at its circumference apertures through which rods 9 project which are suspended like pendulums at 10 on the casing 1 of the filter chamber. For supporting these rods split clips 12 provided with a spherical bearing surface are mounted in the casing 1 (Figs. 3 and 4), the grip of these clips being adjustable by means of a screw 60 or the like. Just below these clips the rods 9 are each provided with an annular rim 61 and these rims carry the frame 3.

A bottom frame 5, preferably of conical shape, is fixed on casing 1 near the lower end of the sleeve sections 2a and is provided with sockets 6 corresponding in number to the number of sleeves. The lower ends of the sleeve sections 2a are secured one to each of these sockets 6.

A freely movable frame 8 provided with coupling sockets 7 is located between the bottom 5 and the frame 3 and has apertures between the coupling sockets to allow the free passage of air. The lower ends of the sleeve sections 2b are each secured to the upper end of a connecting collar 7 and the upper ends of the sleeve sections 2a to the lower ends of these collars. The frame 8, like the frame 3, has apertures in its periphery through which the lower ends of the pendulum rods 9 extend. Annular flanges 62 on these rods 9 hold the frame at the proper height. The position of the frame 8 is so chosen that the lower sleeve sections 2a are about half as long as the upper sleeve sections 2b.

Figure 2:
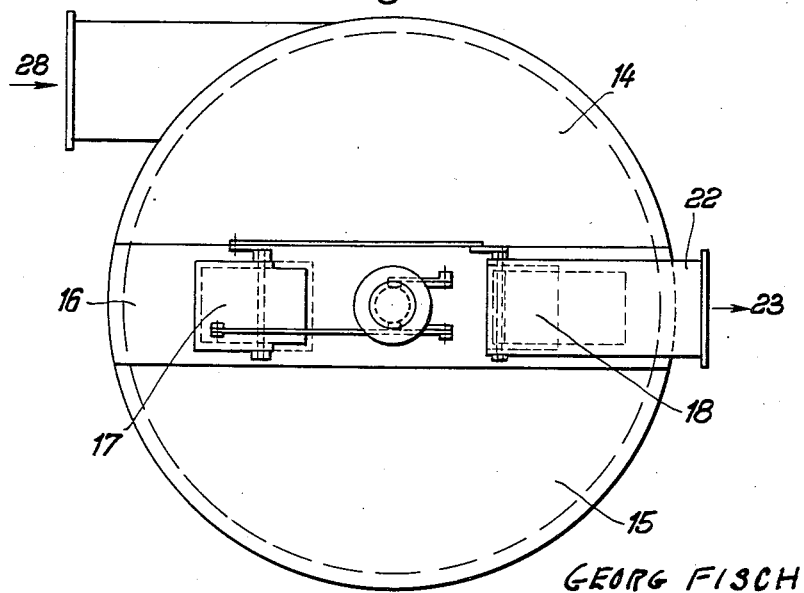
Fig. 2 is a top plan view of Fig. 1.

Cup-shaped members 13 (Figs. 5 and 6) are fitted on the casing 1 of the filter chamber near the lower ends of the pendulum rods 9 so that the free ends of these rods extend into these members with clearance. The frames 3 and 8 are arranged in the casing 1 in such a manner that the sleeve sections 2a and 2b are kept taut or stretched. In the middle of the frame 3 a rotary vibrating device 11 is arranged which is driven by an electric motor 47 which, through the intermediary of a belt 63 and pulley 64, drives a shaft extending through a cover 14, 15, 16 of the casing 1 and carrying at its lower end the vibrating device 11. The outer parts 14 and 15 of the cover (Fig. 2) are removable so as to afford easy access to the frame 3 and the sleeves 2 connected thereto. The middle part 16 of the cover forms a rigid bridge extending across the casing 1 and has two flaps 17 and 18 mounted on hinges. The flap 18 serves for opening and closing the communication aperture between the casing 1 and the air outlet conduit 22 through which the cleansed air escapes from the filter chamber in the direction of the arrow 23. The flap 17 communicates with the atmosphere. The flaps 17 and 18 are interconnected by a parallelogram system of links 19, 20, 21 in such a way that when the flap 18 closes the flap 17 opens and vice versa. The flaps 17 and 18 are actuated from time to time by a device 25, such as a centrifugal pendulum or an electromagnet, which is not described in detail, and a link system 26.

Closable apertures are provided in the casing 1 at 27, 27 to allow easy access to the lower ends of the sleeve sections 2b and the lower and upper ends of the sleeve sections 2a. The filter sleeves can be suspended in the chamber not only through the openings exposed by the cover parts 14, 15 at the upper end of the casing 1 but also through the apertures 27, 27.

The dust-laden air enters tangentially at 28 at the lower end of the filter chamber, passes first through a pre-separator arranged below the bottom 5 but not herein described, and then enters the filter sleeves 2 through the sockets 6 on the bottom 5. The particles of dust which do not drop out at the bottom of the filter sleeves, settle on the walls thereof and the cleansed air flows through the filter chamber and passes into the outlet passage or conduit 22 through the open flap 18.

If the filter sleeves become very dirty they must be cleaned. For this purpose the filter chamber is rendered inoperative by temporarily closing the flap 18. At the same time the motor 47 is switched on which starts up the vibrating or shaking device. This device transmits its rotary oscillating movements to the frame 3 and, through the intermediary of the pendulum rods 9, also to the intermediate frame 8, whereby, owing to the pendulum suspension of the rods 9, the amplitude of oscillation of the intermediate frame 8 is greater than that of the upper sleeve frame 3. Due to the rotary oscillating movements combined with the shaking movements which are produced by the free lower ends of the pendulum rods 9 striking against the walls of the cup-shaped members 13, the dust adhering to the walls of the sleeves drops off and descends to the outlet 30 which is provided with closing means, whence it is removed in a suitable manner not herein described. When the sleeves have been cleaned, the flap 18 is again opened and the filter chamber is once more ready for use. By shaking the sleeves in the manner described, they are saved from wear and tear, which is a particularly important factor when the sleeves are made of delicate material. At the same time the whole structure of the filter chambers is extremely simple and the sleeves are easily accessible.

I claim:

1. In a filter device, a casing having a fixed lower horizontal frame, a plurality of freely swinging rods pivotally carried in the casing, an upper movable frame supported by said rods, a series of vertical sectional filter sleeves suspended from the upper frame and attached to the lower frame in stretched condition, a vibrator acting on the movable frame to impart a rotary oscillating movement to the sleeves, and a second movable frame pivotally supported on the lower free ends of the rods, and collars on said second movable frame for connection with the opposite sections of said sleeves.

2. In a filter device as set forth in claim 1, wherein stationary abutments are arranged in said casing adjacent the free ends of said rods limiting the amplitude of oscillation of said rods and at the same time producing an additional shaking movement.

3. In a filter device as set forth in claim 1, wherein means are provided for braking the oscillating movement of the rods.

4. In a filter device as set forth in claim 1, wherein the filter sleeves are divided into sectional lengths which are united by collars carried by the second movable frame at a point near the bottom third of the sleeve length.

5. In a filter device as set forth in claim 1, wherein the filter chamber is closed at its upper end above the vibrator for imparting the rotary oscillating movement to the sleeve assembly through the intermediary of said frames, by a cover allowing easy access to the upper ends of the filter sleeves, and motor means arranged outside this cover for driving the vibrator for imparting the rotary oscillating motion.

6. In a filter device as set forth in claim 1, wherein the device for imparting the rotary oscillating motion to the sleeve aggregate through the intermediary of said frames consists of an unbalanced member arranged in the casing of the filter chamber, a cover above the unbalanced member, motor means for driving the unbalanced member arranged outside the casing of the filter chamber and connected to the unbalanced member by a shaft extending through the said cover.

7. In a filter device, a fixed horizontal lower frame, a vertically spaced movable horizontal upper frame, a series of vertical filter sleeves connecting said frames, a vibrator acting on the movable frame to impart a transverse rotary oscillating movement to the sleeves, and means operated from the movable frame and connected with the sleeves at intermediate points thereon to transmit transverse oscillation.

References Cited in the file of this patent

UNITED STATES PATENTS

| 1,512,776 | Lough | Oct. 21, 1924 |
| 1,791,102 | McDevitt | Feb. 3, 1931 |
| 2,143,664 | Snyder | Jan. 10, 1939 |
| 2,167,236 | Gieseler | July 25, 1939 |
| 2,335,315 | Seymour | Nov. 30, 1943 |
| 2,519,082 | Stevenson | Aug. 15, 1950 |
| 2,667,233 | Vedder | Jan. 26, 1954 |

FOREIGN PATENTS

| 17,899 | France | Dec. 6, 1913 |
| | (1st addition to No. 445,994) | |
| 332,475 | Great Britain | July 24, 1930 |
| 351,588 | Italy | Aug. 16, 1937 |
| 699,348 | Germany | Nov. 27, 1940 |
| 758,640 | France | Nov. 7, 1933 |